United States Patent
Tang et al.

(10) Patent No.: US 10,127,253 B2
(45) Date of Patent: Nov. 13, 2018

(54) SEARCHING METHOD, CLIENT AND SERVER

(71) Applicant: BAIDU ONLINE NETWORK TECHNOLOGY (BEIJING) CO., LTD., Beijing (CN)

(72) Inventors: Xian Tang, Beijing (CN); Jianchun Xu, Beijing (CN); Zefeng Ma, Beijing (CN); Jinxia Bao, Beijing (CN); Ruixing Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 785 days.

(21) Appl. No.: 14/585,350

(22) Filed: Dec. 30, 2014

(65) Prior Publication Data

US 2015/0278266 A1 Oct. 1, 2015

(30) Foreign Application Priority Data

Mar. 28, 2014 (CN) .......................... 2014 1 0124056

(51) Int. Cl.
*G06F 17/30* (2006.01)

(52) U.S. Cl.
CPC .... *G06F 17/30321* (2013.01); *G06F 17/3064* (2013.01); *G06F 17/30554* (2013.01); *G06F 17/30598* (2013.01); *G06F 17/30864* (2013.01); *G06F 17/30873* (2013.01)

(58) Field of Classification Search
CPC ..................................................... G06F 17/30
See application file for complete search history.

(56) References Cited

U.S. PATENT DOCUMENTS

| | | | | |
|---|---|---|---|---|
| 5,842,203 A * | 11/1998 | D'Elena | ............ | G06F 17/30398 707/999.004 |
| 5,966,123 A * | 10/1999 | Kaplan | ................ | G06F 3/0481 707/999.001 |
| 6,144,968 A * | 11/2000 | Zellweger | ......... | G06F 17/30265 707/999.103 |
| 8,352,487 B2 * | 1/2013 | Lewak | .............. | G06F 17/30389 707/767 |
| 2002/0087408 A1 * | 7/2002 | Burnett | .................. | G06Q 30/02 707/999.003 |
| 2004/0083206 A1 | 4/2004 | Wu et al. | | |
| 2008/0154859 A1 | 6/2008 | Chi et al. | | |
| 2010/0076952 A1 | 3/2010 | Wang et al. | | |

FOREIGN PATENT DOCUMENTS

| | | |
|---|---|---|
| CN | 102236691 A | 11/2011 |
| CN | 102880624 A | 1/2013 |
| CN | 102902728 A | 1/2013 |
| CN | 102968465 A | 3/2013 |
| JP | 2002189742 A | 7/2002 |
| JP | 2003016085 A | 1/2003 |
| JP | 2005063366 A | 3/2005 |
| WO | 01/22251 A2 | 3/2001 |
| WO | 01/75728 A1 | 10/2001 |

* cited by examiner

*Primary Examiner* — Khanh B Pham
(74) *Attorney, Agent, or Firm* — Hodgson Russ LLP (57) ABSTRACT

A searching method, a client and a server are provided. The searching method includes: obtaining, at a client device, a query set selected from two or more multi-level classification webpages; sending the query set from the client device to a server; and receiving, at the client device, search results according to the query set from the server.

4 Claims, 9 Drawing Sheets

SEARCHING METHOD, CLIENT AND SERVER

CROSS REFERENCE TO RELATED APPLICATION

This application claims priority to Chinese Patent Application No. 201410124056.8, entitled "SET SEARCHING METHOD, CLIENT DEVICE AND SERVER", filed with State Intellectual Property Office on Mar. 28, 2014, the entire content of which is incorporated herein by reference.

FIELD

Embodiments of the present invention generally relate to a computer networking technology, and more particularly to a searching method, a client, a server and a non-transitory computer readable storage medium.

BACKGROUND

With the development of the computer technology, the application of the internet has been popularized and a user can obtain needed resources via a search engine. Currently, the user can search resources by inputting a key word in the search box of the search engine.

In order to improve the accuracy of the search result, the user can input a plurality of key words in the search box to perform a combination search, such that the scope of the search result may be narrowed and the user can obtain the needed resources quickly.

However, there are following defects in the related art. Searching for the resources by inputting key words, the search result is not precise and it is difficult to determine the requirement of the user quickly and accurately. Moreover, with the combination search by using the plurality of key words, the plurality of key words can be combined only in a same level webpage, and the dimension is single and the search result cannot satisfy the requirement of the user, thus resulting in a poor user experience.

SUMMARY

Embodiments of the present invention seek to solve at least one of the problems existing in the related art to at least some extent.

Accordingly, a first object of the present disclosure is to provide a searching method, which can avoid a repeated search and improve a search efficiency. Moreover, the method can also obtain a search result satisfying a requirement of the user even when the user does not know details about a search object, thus improving a user experience.

A second object of the present disclosure is to provide another searching method.

A third object of the present disclosure is to provide a client.

A fourth object of the present disclosure is to provide a server.

A fifth object of the present disclosure is to provide a non-transitory computer readable storage medium.

In order to achieve objects, embodiments of a first aspect of the present disclosure provide a searching method, comprising: obtaining, at a client device, a query set selected from two or more multi-level classification webpages; sending the query set from the client device to a server; and receiving, at the client device, search results according to the query set from the server.

With the searching method according to embodiments of the present disclosure, the query set selected from the two or more multi-level classification webpages is obtained and sent to the server, such that the server can perform the search according to the query set, thus avoiding the repeated search and improving the search efficiency. Moreover, when the user does not know the details about the search object, the method can also obtain the search result satisfying the requirement of the user, thus improving the user experience.

Embodiments of a second aspect of the present disclosure provide another searching method, comprising: receiving, at one or more computing devices, a query set sent from a client device; querying a reverse index database of a search object according to the query set to obtain, at the one or more computing devices, search results; and returning the search results to the client device.

With the searching method according to embodiments of the present disclosure, the one or more computing devices (e.g., server) queries the reverse index database of the search object according to the query set, and thus the search result is accurate. Moreover, the search results are sequenced according to the number of occurrence of the search object in each of the search results, such that the search result satisfies the requirement of the user and the user experience is also improved.

Embodiments of a third aspect of the present disclosure provide a client device, comprising one or more computing devices configured to execute one or more software modules, the modules including: an obtaining and sending module configured to obtain a query set selected from two or more multi-level classification webpages and to send the query set to a server; and a receiving module configured to receive search results returned by the server according to the query set.

With the client device according to embodiments of the present disclosure, the query set selected from two or more multi-level classification webpages is obtained and sent to the server, such that the server can perform the search according to the query set, thus avoiding the repeated search and improving the search efficiency. Moreover, when the user does not know the details about the search object, the client can also obtain the search result satisfying the requirement of the user, thus improving the user experience.

Embodiments of a fourth aspect of the present disclosure provide a server comprising one or more computing devices configured to execute one or more software modules, the modules including: a receiving module configured to receive a query set sent from a client device; a searching module configured to query a reverse index database of a search object according to the query set to obtain search results; and a returning module configured to return the search results to the client device.

With the server according to embodiments of the present disclosure, the server queries the reverse index database of the search object according to the query set, and thus the search result is accurate. Moreover, the search results are sequenced according to the number of occurrence of the search object in each of the search results, such that the search result satisfies the requirement of the user and the user experience is also improved.

Embodiments of a fifth aspect of the present disclosure provide a non-transitory computer readable storage medium, comprising a computer program configured to execute the above-identified searching method on one or more computing devices.

Additional aspects and advantages of embodiments of the present invention will be given in part in the following descriptions and accompanying drawings, become apparent in part from the following descriptions and accompanying drawings, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which.

DETAILED DESCRIPTION

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

A searching method, a client and a server according to embodiments of the present disclosure will be described in the following with reference to drawings.

Figure 1:
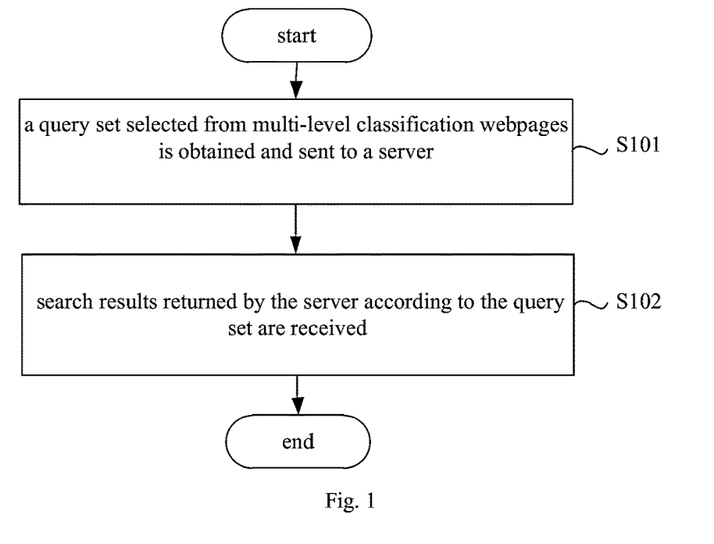
FIG. 1 is a flow chart of a searching method according to an embodiment of the present disclosure.

FIG. 1 is a flow chart of a searching method according to an embodiment of the present disclosure. The method is described at a client side. As shown in FIG. 1, the searching method includes following steps.

At step S101, a query set selected from two or more multi-level classification webpages is obtained and sent to the server.

In the embodiment of the present disclosure, the multi-level classification webpages are at least two-level classification webpages. There may be a plurality of category information about a search object in a first level classification webpage, and each category information may correspond to a second level classification webpage, i.e., after certain category information in the first level classification webpage is clicked, the second level classification webpage corresponding to the certain category information may be entered.

In some embodiments, a client may obtain the query that a user selects from the multi-level classification webpages, in which the user may select at least one query (i.e., the category information) from each of the multi-level classification webpages, and then the client combines the queries selected from the multi-level classification webpages having different levels to obtain the query set and sends the query set to the server, such that the server can perform a search after receiving the query set.

In an embodiment of the present disclosure, the multi-level classification webpages are established before obtaining the query set selected from the multi-level classification webpages. In an embodiment, the client obtains category information of a search object, and establishes and displays the multi-level classification webpages according to the category information.

In some embodiments, the client may obtain the category information of the search object in a following mode. The client obtains initial category information of the search object from the server, processes the initial category information of the search object, and obtains the category information of the search object.

In some embodiments, the initial category information is obtained by the server via a web robot (such as a web crawler or a web spider) or by extracting information in a database at a server side. The initial category information obtained via the web robot is user generated content (UGC) data, i.e., original contents displayed or provided to other users by the user via the internet, which is easy to obtain and has a small data noise, and thus can be used without processing. In some embodiments, the initial category information obtained by extracting information in the database at the server side mainly includes initial category information obtained by identifying an intention of Q&A data and processing the data by natural language processing, such as Chinese segmentation, part-of-speech tagging and title entity identification. The client may also obtain the initial category information from a search log. The initial category information obtained by extracting information in the database at the server side generally has a great data noise which needs to be processed. In some embodiments, the client may count a word frequency of each initial category information and remove the initial category information having a word frequency less than a predetermined threshold, thus completing the processing on the initial category information of the search object.

In some embodiments, after the category information of the search object is obtained, the client sends the category information to the server, such that the server can establish the reverse index database of the search object according to the category information.

In some embodiments, the search object includes at least one selected from a group consisting of novels, music, applications, travel destinations, articles and shopping guides.

At step S102, search results returned by the server according to the query set are received.

In some embodiments, after the server performs the search according to the query set and obtains the search results, the client receives the search results and displays the search results to the user.

In an embodiment of the present disclosure, the plurality of category information in the first level classification webpage and the category information in the second level classification webpage corresponding to each of the category information in the first level classification webpage may be mutually exclusive. In this way, the user may be guided to combine different category information reasonably so as to perform the search, thus avoiding a repeated search on a same category and improving the search efficiency.

With searching method according to embodiments of the present disclosure, the query set selected from multi-level classification webpages is obtained and sent to the server, such that the server can perform the search according to the query set, thus avoiding the repeated search and improving the search efficiency. Moreover, the method can also obtain the search result satisfying the requirement of the user when the user does not know the details about the search object, thus improving the user experience.

Figure 2:
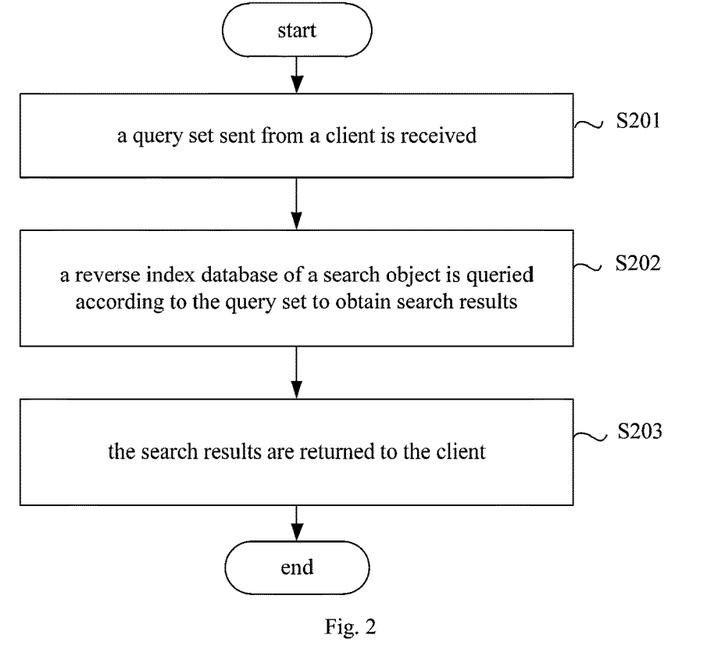
FIG. 2 is a flow chart of a searching method according to another embodiment of the present disclosure.

FIG. 2 is flow chart of a searching method according to another embodiment of the present disclosure. The method will be described from the server side, as shown in FIG. 2, the searching method includes following steps.

At step S201, a query set sent from a client is received.

In some embodiments, the server may receive the query set selected from multi-level classification webpages and sent from the client so as to search the query set.

At step S202, a reverse index database of a search object is queried according to the query set to obtain search results.

In some embodiments, after receiving the query set selected from multi-level classification webpages and sent from the client, the server queries the reverse index database of the search object according to the query set and obtains the search results.

In an embodiment of the present disclosure, the reverse index database of the search object is established before the reverse index database of the search object is queried according to the query set. In some embodiments, the server receives the category information of the search object sent form the client firstly, obtains search object information corresponding to the category information according to the category information, and establishes a correspondence between the category information and the search object information according to the category information and the search object information corresponding to the category information, thus establishing the reverse index database of the search object.

In an embodiment of the present disclosure, after receiving the query set sent from the client, the server may update the corresponding reverse index database according to the query in the query set. For example, if the query set is "warm+farming", the server may update the reverse index database corresponding to the query set "warm+farming".

At step S203, the search results are returned to the client.

In some embodiments, the server sequences the search results to obtain sequenced search results and returns the sequenced search results to the client. In an embodiment of the present disclosure, the server counts a number of occurrence of the search object (for example, word frequency) in each of the search results and sequences the search results according to the number of occurrence.

With the searching method according to embodiments of the present disclosure, the server queries the reverse index database of the search object according to the query set, and thus the search result is accurate. Moreover, the search results are sequenced according to the number of occurrence of the search object in each of the search results, such that the search result satisfies the requirement of the user and the user experience is also improved.

Figure 3:
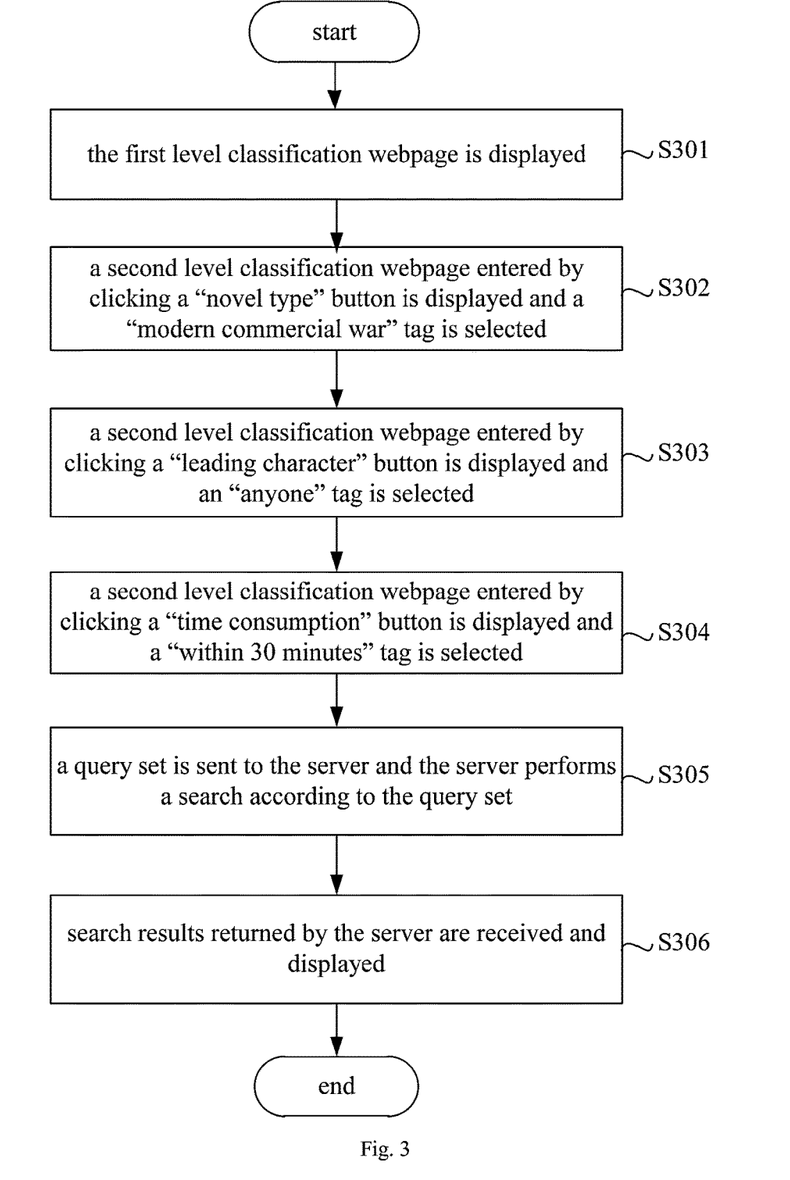
FIG. 3 is a flow chart of searching a novel using a searching method according to an embodiment of the present disclosure.

FIG. 3 is a flow chart of searching for a novel using the searching method according to an embodiment of the present disclosure. As shown in FIG. 3, the method includes following steps.

At step S301, a first level classification webpage is displayed.

Figure 4:
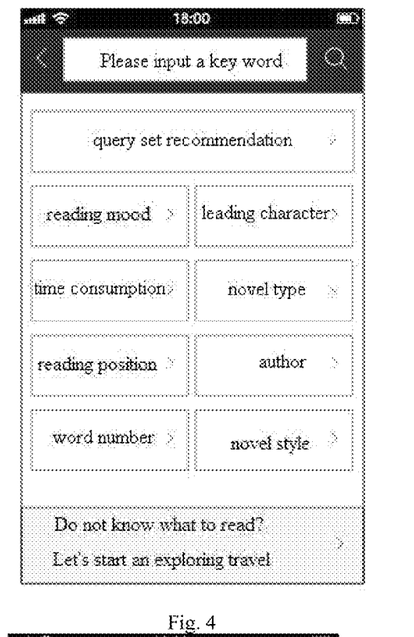
FIG. 4 is a schematic diagram of a main interface of searching a novel using a searching method according to an embodiment of the present disclosure.

In some embodiments, as shown in FIG. 4, the first level classification webpage includes eight categories (i.e., eight tags) such as "reading mood", "leading character", "time consumption", "novel type", "reading position", "author", "word number" and "novel style", and each category corresponds to a button. Above categories are just exemplary and are not limited herein. The category in the first level classification webpage may further include "writing style", "school feature", "story background", "identity of leading character", "characteristics of leading character", "relationship between leading characters", "plot", "novel type" and "word number". The user can enter the corresponding second level classification webpage by clicking the button, for example, the user enters a "reading mood" webpage after clicking a "reading mood" button.

In addition, the client provides a "query set recommendation" button for entering to a corresponding "query set recommendation" webpage. The "query set recommendation" is a default page of the search function. In an embodiment of the present disclosure, as shown in FIG. 4, the client does not display the first level classification webpage independently, but displays the "query set recommendation" button and buttons showing the categories in the first level classification webpage in a same webpage simultaneously. In another embodiment of the present disclosure, the default page and the first level classification webpage may be separated from each other and be displayed in different webpages respectively. If above categories cannot satisfy the requirement of the user, the categories in the first level classification webpage may be changed until the requirement of the user is satisfied.

At step S302, a second level classification webpage entered by clicking a "novel type" button is displayed and a "modern commercial war" tag is selected.

Figure 5:
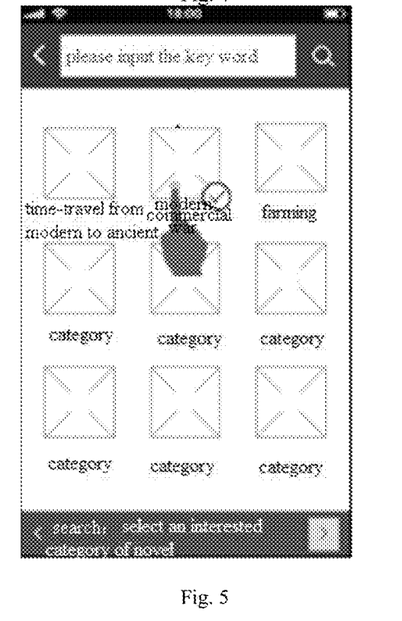
FIG. 5 is a schematic diagram of a webpage for searching for a category of a novel.

After the user clicks the "novel type" button and enters the "novel type" webpage, the client displays various novel category tags in the webpage, such as "time-travel from modern to ancient", "modern commercial war" and "farming", and then the user can select an interested tag. As shown in FIG. 5, when the user selects the "modern commercial war" tag, a query "modern commercial war" is displayed in a search input box, and the first level classification webpage is returned to.

At step S303, a second level classification webpage entered by clicking a "leading character" button is displayed and an "anyone" tag is selected.

Figure 6:
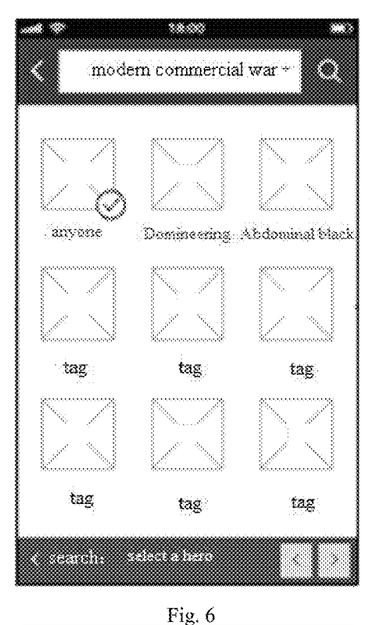
FIG. 6 is a schematic diagram of a webpage for searching for an identity of a leading character in a novel.

After clicking the "leading character" button and entering the "leading character" webpage, the client displays various categories of the leading character in the webpage, such as "anyone", "domineering" and "abdominal black", and the user can select an interested one. As shown in FIG. 6, the user selects the "anyone" tag, which indicates that the user has no requirement for an image of the leading character, and thus the query "anyone" needs not to be add into the search input box, and the first level classification webpage is returned to.

At step S304, a second level classification webpage entered by clicking a "time consumption" button is displayed and a "within 30 minutes" tag is selected.

Figure 7:
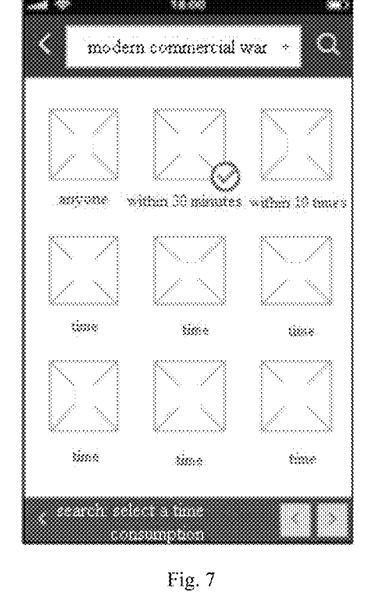
FIG. 7 is a schematic diagram of a webpage for searching for a time consumption of a novel.

After the user clicks a "time consumption" button and enters the "time consumption" webpage, the client may display various categories of time consumption, such as "anyone", "within 30 minutes" and "within 10 minutes", and the user can select an interested one. As shown in FIG. 7, the user selects the "within 30 minutes" tag, which indicates that reading the novel can be finished within 30 minutes. At the same time, the query "within 30 minutes" is added to the search input box and the first level classification webpage is returned to.

At step S305, a query set is sent to the server and the server performs a search according to the query set.

Figure 8:
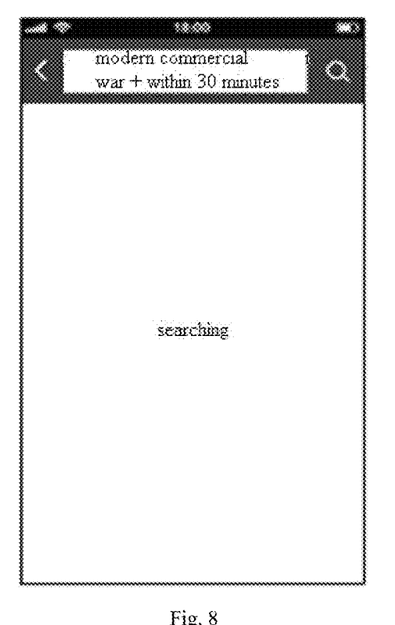
FIG. 8 is a schematic diagram of a webpage showing that the searching is in progress.

The client combines the tags selected in different second level classification webpages to obtain a tag combination, i.e., "modern commercial competition+within 30 minutes", and sends the tag combination to the server, such that the server can perform the search according to the tag combination. As shown in FIG. 8, since there is no requirement for the leading character, the "anyone" tag is not added into the tag combination.

At step S306, search results returned by the server are received and displayed.

Figure 9:
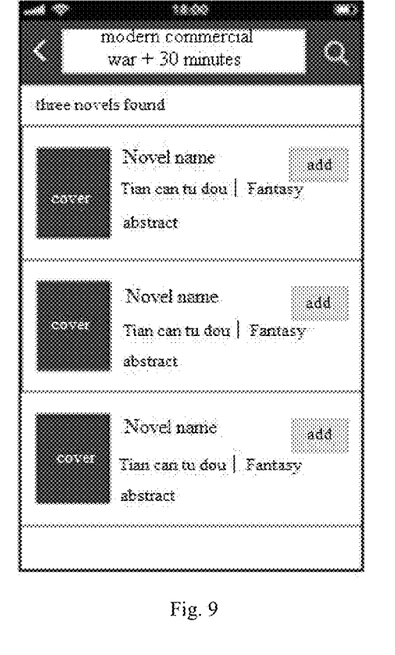
FIG. 9 is a schematic diagram of a webpage displaying search results of searching a novel.

After performing the search according to the tag combination, the server returns the search result to the client. The client receives the search result and displays the result according to a predetermined sequence. In an embodiment of the present disclosure, the client receives the novels all having the novel type of "modern commercial war", the leading character being "anyone" and the time consumption being "within 30 minutes" and displays these novels. As shown in FIG. 9, the search results are three novels according to the tag combination of "modern commercial war+within 30 minutes". The client displays a name, a type, a cover image and an abstract of the novel to the user, such that the user can select an interested novel.

In some embodiments, the server performs the search via a reverse index which is relative to a forward index. The forward index of the novel is a mapping from the novel name (for example, identification (ID)) to a novel tag and the novel tag corresponding to a certain novel name (i.e. ID) may be found rapidly according to the mapping. However, if searching a set of novel names including the novel tag according to the novel tag reversely, the forward index has a low efficiency. The reverse index may establish a correspondence from the novel tag to the novel name (ID), and thus it is easy to find the needed novel according to the novel tag.

In the combination search, the novels are searched according to the tags that the user selects from multi-level classification webpages. The novel including more tags may rank higher in a result list. Thus, the novels may be sequenced and displayed according to the number of occurrence of the novel in the search results and a popularity of the novel.

Figure 10:
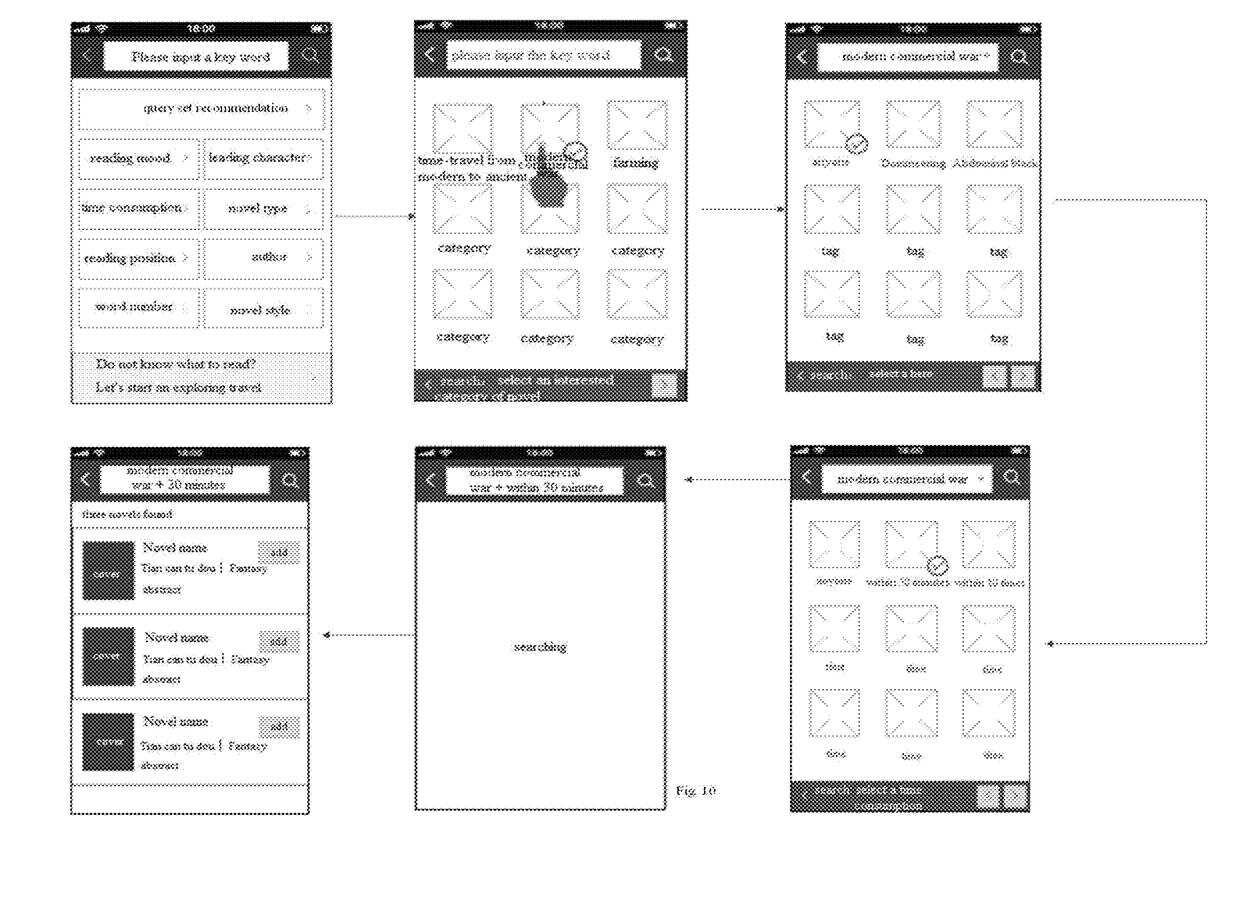
FIG. 10 is a schematic diagram of a process of performing a search in multi-level classification webpages.

A process of performing a combination search in multi-level classification webpages is shown in FIG. 10.

Figure 11A:
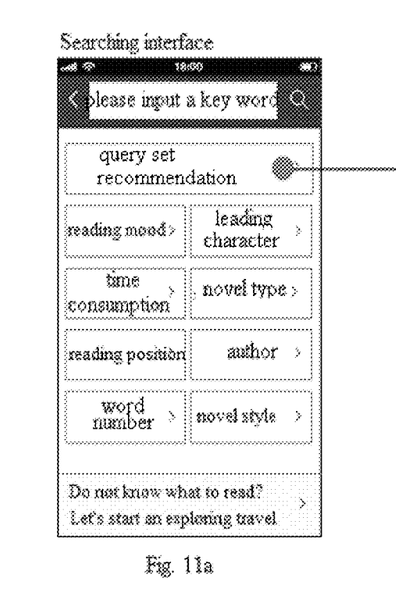
FIGS. 11a, 11b and 11c are schematic diagrams of recommending a combination search and displaying search results.
Figure 11B:
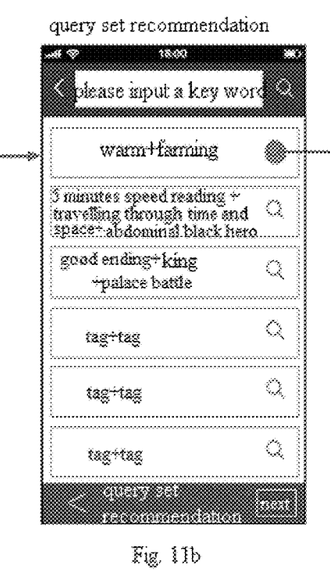
Figure 11C:
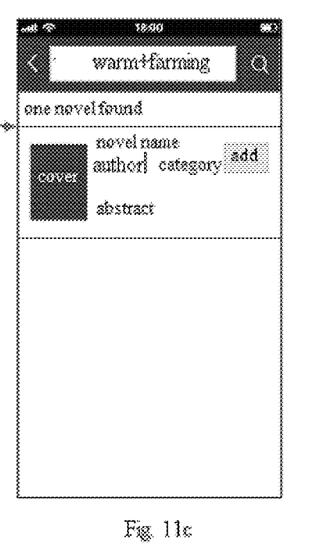

In an embodiment of the present disclosure, the client provides a "query set recommendation" button for entering a corresponding recommendation webpage. After clicking the "query set recommendation" button, the user enters a "query set recommendation" webpage as shown in FIG. 11a. In the webpage shown in FIG. 11b, various combinations are provided to the user automatically, such as "warm+farming" and "five minutes speed reading+travelling through time and space+abdominal black hero". When the user selects one of the combinations, the search is performed according to the selected combination automatically and the corresponding search results are obtained, as shown in FIG. 11c.

In addition, the above multi-level classification webpages may be displayed in different forms. For example, when one category is selected in the first level classification webpage, the popup second level classification webpage may be displayed in a floating layer.

Figure 12A:
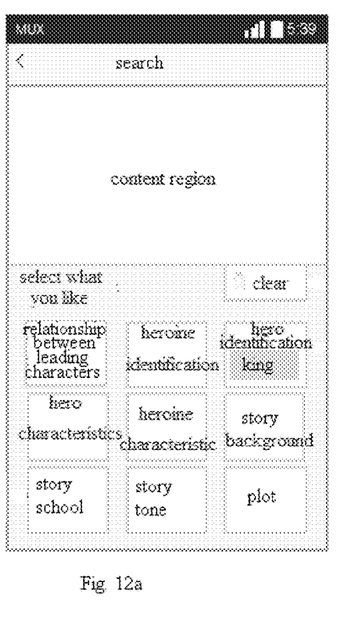
FIGS. 12a and 12b are schematic diagrams of displaying a combination search.
Figure 12B:
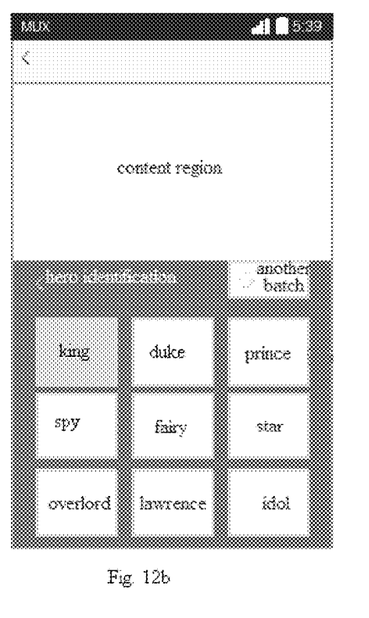

As shown in FIG. 12a, the first level classification webpage includes categories such as "relationship between leading characters", "heroine identification", "hero identification", "story background" and "story group", which are displayed in button forms. When a button (such as "hero identification" button) is clicked, the second level classification webpage of "hero identification" will be displayed in the floating layer, as shown in FIG. 12b. The second level classification webpage includes categories such as "king", "duke", "prince", "spy" and "star" all shown in tag forms. When the user selects the "king" tag, the corresponding floating layer is closed, and the "hero identification" tag is changed into "king" tag. If the above categories do not satisfy the requirement of the user, an "another batch" button in the floating layer may be clicked to change the categories displayed, until the requirement of the user is satisfied. Other categories in the first level classification webpage may also be selected according to the above method. Finally, the search categories selected from multi-level classification webpages are combined and the search results are displayed according to the predetermined sequence.

With the searching method according to embodiments of the present disclosure, the user is guided efficiently, and the search is performed according to the combination of the categories selected in the multi-level classification webpages, such that the obtained search results (such as required novels) satisfy the requirement of the user much better and the user experience is improved.

Embodiments of the present disclosure further provide a client.

Figure 13:
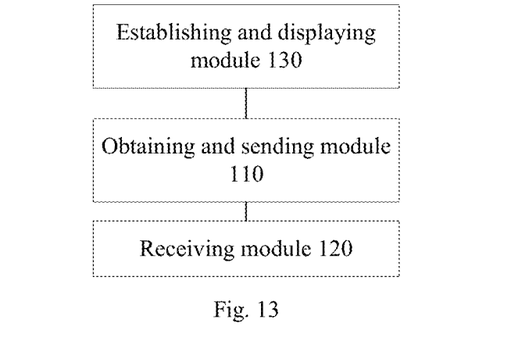
FIG. 13 is a block diagram of a client according to an embodiment of the present disclosure.

FIG. 13 is a schematic diagram of a client according to an embodiment of the present disclosure. As shown in FIG. 13, the client can include one or more computing devices configured to execute software modules. For example, the software modules can include an obtaining and sending module 110, a receiving module 120 and an establishing and displaying module 130.

The obtaining and sending module 110 is configured to obtain a query set selected from multi-level classification webpages and to send the query set to a server.

In the embodiment of the present disclosure, the multi-level classification webpages are at least two-level classification webpages. There may be a plurality of category information about a search object in the first level classification webpage, and each category information may correspond to one second level classification webpage, i.e., after certain category information in the first level classification webpage is clicked, the second level classification webpage corresponding to the certain category information may be entered. The plurality of category information in the first level classification webpage and the corresponding category information in the second level classification webpage are mutually exclusive. In this way, the user may be guided to combine different category information reasonably to perform the combination search, thus avoiding the repeated search on a same category and improving the search efficiency.

In some embodiments, the obtaining and sending module 110 may obtain the queries selected from the multi-level classification webpages, in which the user selects at least one query (i.e., the category information) from each of the multi-level classification webpages, and then the obtaining and sending module 110 combines the queries selected from the classification webpages having different levels to obtain the query set and sends the query set to the server, such that the server can perform the search after receiving the query set.

In some embodiments, after obtaining the category information of the search object, the obtaining and sending module 110 may send the category information to the server, such that the server can establish a reverse index database of the search object according to the category information. In an embodiment, the search object may include at least one selected from a group consisting of: novels, music, applications, travel destinations, articles and shopping guides.

The receiving module 120 is configured to receive the search results returned by the server according to the query set.

In some embodiments, after the server performs the search according to the query set and obtains the search results, the receiving module 120 receives the search results and displays the search results to the user.

In an embodiment of the present disclosure, the plurality of category information in the first level classification webpage and the category information corresponding to the plurality of category information in the first level classification webpage in the second level classification webpage are mutually exclusive. In this way, the user may be guided to combine different category information reasonably so as to perform the search, thus avoiding a repeated search on a same category and improving the search efficiency.

The establishing and displaying module 130 is configured to obtain category information of the search object, to establish multi-level classification webpages and to display the multi-level classification webpages according to the category information before obtaining the query set selected from the multi-level classification webpages.

In some embodiments, the establishing and displaying module 130 may obtain the category information of the search object in the following mode. Firstly initial category information of the search object is obtained from the server, the initial category information of the search object is processed, and the category information of the search object is obtained. The initial category information may include category information that the server obtains by using a web robot (such as a web crawler or a web spider) or by extracting information in the database at the server side. The initial category information obtained by using the web crawler is UGC data, i.e., the original content displayed or provided to other users by the user via the internet, which is easy to obtain and has a small data noise, and thus the data can be used without processing. In some embodiments, the initial category information that the establishing and displaying module 130 obtains by extracting information in the database at the server side includes initial category information obtained by identifying the intention of Q&A data and performing a natural language processing such as Chinese segmentation, part-of-speech tagging and title entity identification. The establishing and displaying module 130 may also obtain the initial category information from the search log. The initial category information obtained by extracting information in the database at the server side generally has a great data noise and needs to be processed. In some embodiments, the establishing and displaying module 130 counts a word frequency of the initial category information and removes the initial category information having the word frequency less than a predetermined threshold, thus completing the processing on the initial category information of the search object.

With the client according to embodiments of the present disclosure, the query set selected from multi-level classification webpages is obtained and sent to the server, such that the server can perform the search according to the query set, thus avoiding the repeated search and improving the search efficiency. Moreover, the client can also obtain the search result satisfying the requirement of the user even when the user does not know the details about the search object, thus improving the user experience.

Figure 14:
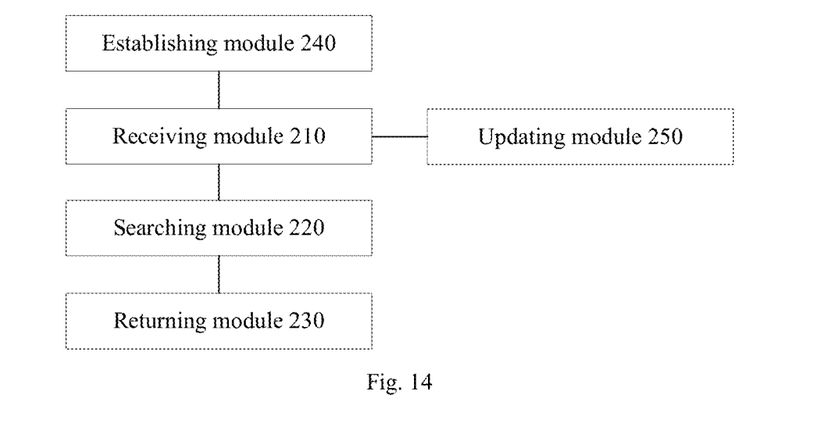
FIG. 14 is a block diagram of a server according to an embodiment of the present disclosure.

FIG. 14 is a schematic of a server according to an embodiment of the present disclosure. As shown in FIG. 14, the server includes a receiving module 210, a searching module 220, a returning module 230, an establishing module 240 and an updating module 250.

The receiving module 210 is configured to receive a query set sent from a client.

In some embodiments, the receiving module 210 may receive the query set selected from multi-level classification webpages and sent from the client so as to search the query set.

The searching module 220 is configured to query a reverse index database of a search object according to the query set to obtain search results.

In some embodiments, after receiving the query set selected from multi-level classification webpages and sent from the client, the searching module 220 queries the reverse index database of the search object according to the query set and obtains the search results.

The returning module 230 is configured to return the search results to the client.

In some embodiments, the returning module 230 sequences the search results to obtain a sequenced search results and returns the sequenced search results to the client. In an embodiment of the present disclosure, the returning module 230 counts the number of occurrence of the search object in each of the search results and sequences the search results according to the number of occurrence.

The establishing module 240 is configured to establish the reverse index database of the search object before the searching module 220 queries the reverse index database of the search object according to the query set. In some embodiments, the establishing module 240 is configured to receive category information of the search object sent from the client, to obtain search object information corresponding to the category information according to the category information, to establish a correspondence between the category information and the search object information according to the category information and the search object information corresponding to the category information, thus establishing the reverse index database of the search object.

The updating module 250 is configured to update the reverse index database according to the query in the query set, after the receiving module 210 receives the query set sent from the client. For example, if the query set is "warm+farming", the updating module 250 only needs to update the reverse index database corresponding to the query set "warm+farming".

With the server according to embodiments of the present disclosure, the server queries the reverse index database of the search object according to the query set, and thus the search result is accurate. Moreover, the search results are sequenced according to the number of occurrence of the search object in each of the search results, such that the search result satisfies the requirement of the user and the user experience is also improved.

Embodiments of a fifth aspect of the present disclosure provide a non-transitory computer readable storage medium, comprising a computer program configured to execute the above-identified searching method on one or more computing devices.

With the non-transitory computer readable storage medium according to embodiments of the present disclosure, the server queries the reverse index database of the search object according to the query set, and thus the search result is accurate. Moreover, the search results are sequenced according to the number of occurrence of the search object in each of the search results, such that the search result satisfies the requirement of the user and the user experience is also improved.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A computer-implemented searching method, comprising:

obtaining, at a client device, a query set selected from two or more multi-level classification webpages;

sending the query set from the client device to a server;

receiving, at the client device, search results according to the query set from the server;

before obtaining a query set selected from two or more multi-level classification webpages, further comprising:

obtaining, at the client device, category information of a search object; and establishing and displaying, at the client device, the two or more multi-level classification webpages according to the category information;

wherein obtaining category information of a search object comprises:

obtaining, at the client device, initial category information of the search object from the server;

processing, at the client device, the initial category information of the search object; and obtaining, at the client device, the category information of the search object;

wherein:

the initial category information is obtained by the server via a web crawler or by extracting information in a database at a server side; and processing the initial category information of the search object comprises:

counting, at the client device, a word frequency of the initial category information; and removing, at the client device, a portion of the initial category information having the word frequency less than a predetermined threshold.

2. The method according to claim 1, further comprising:
sending the category information from the client device to the server so as to establish a reverse index database of the search object by the server according to the category information.

3. A non-transitory computer readable storage medium, comprising one or more computer programs configured to execute the following steps on one or more computing devices:
   obtaining a query set selected from two or more multi-level classification webpages;
   sending the query set to a server;
   receiving search results returned according to the query set from the server; and
   before obtaining a query set selected from multi-level classification webpages:
      obtaining category information of a search object; and
      establishing and displaying the multi-level classification webpages according to the category information;
      obtaining initial category information of the search object from the server;
      processing the initial category information of the search object; and
      obtaining the category information of the search object;
   wherein the initial category information is obtained by identifying an intention of question and answer data and performing natural language processing; and
   wherein:
      the initial category information is obtained by the server via a web crawler or by extracting information in a database at a server side; and
      processing the initial category information of the search object comprises:
         counting, at the client device, a word frequency of the initial category information; and
         removing, at the client device, a portion of the initial category information having the word frequency less than a predetermined threshold.

4. The non-transitory computer readable storage medium according to claim 3, further comprising:
sending the category information to the server so as to establish a reverse index database of the search object by the server according to the category information.

* * * * *